United States Patent [19]
von Froreich

[11] Patent Number: 5,605,218
[45] Date of Patent: Feb. 25, 1997

[54] CONVEYOR SYSTEM, PARTICULARLY FOR MATERIAL CARRIERS FOR USE IN MEDICAL LABORATORIES

[76] Inventor: André von Froreich, Forsthöhe 33 D-21149, Hamburg, Germany

[21] Appl. No.: 528,939

[22] Filed: Sep. 15, 1995

[30] Foreign Application Priority Data

Sep. 28, 1994 [DE] Germany ............... 44 34 714.6

[51] Int. Cl.⁶ .................................................. B65G 29/00
[52] U.S. Cl. ........................... 198/465.2; 198/803.01
[58] Field of Search ................. 198/358, 465.1, 198/465.2, 463.6, 803.01, 817

[56] References Cited

U.S. PATENT DOCUMENTS

| 1,476,936 | 12/1923 | Walden . | |
|---|---|---|---|
| 4,899,865 | 2/1990 | Keil | 198/465.2 X |
| 5,103,963 | 4/1992 | Sticht | 198/465.2 |
| 5,203,446 | 4/1993 | Ufland | 198/465.2 |
| 5,205,026 | 4/1993 | Sticht | 198/465.2 X |
| 5,244,079 | 9/1993 | Osamu | 198/803.01 X |

FOREIGN PATENT DOCUMENTS

| 0223683 | 5/1987 | European Pat. Off. . | |
|---|---|---|---|
| 03400639 | 11/1989 | European Pat. Off. . | |
| 0430739 | 6/1991 | European Pat. Off. . | |
| 1584561 | 2/1970 | Germany . | |
| 3518134 | 11/1986 | Germany . | |
| 4107293 | 9/1991 | Germany | 198/465.2 |
| 4244351 | 7/1993 | Germany . | |
| 9113013 | 9/1991 | WIPO . | |

Primary Examiner—James R. Bidwell
Attorney, Agent, or Firm—Friedrich Kueffner

[57] ABSTRACT

A conveyor system, particularly for material carriers for use in medical laboratories, includes two endless motor-driven belts which are guided in the conveying area in a horizontal plane parallel to each other and in the same direction. The conveyor belts are guided on components which extend in conveying direction and have upwardly extending side walls. At the beginning and the end of a conveying distance, the conveyor belts are guided around deflection rollers. A second conveying path is arranged parallel to and extending along a predetermined portion of the first conveying path, wherein the second conveying path includes two endless conveyor belts which are driven in the same direction independently of the conveyor belts of the first conveying path and extend parallel to each other in a horizontal plane. A switch is provided for transferring the material carriers from one of the conveying paths to the other conveying path.

8 Claims, 6 Drawing Sheets

CONVEYOR SYSTEM, PARTICULARLY FOR MATERIAL CARRIERS FOR USE IN MEDICAL LABORATORIES

BACKGROUND OF THE INVENTION

1. Field of the Invention

The present invention relates to a conveyor system, particularly for material carriers for use in medical laboratories. The conveyor system includes two endless motor-driven belts which are guided in the conveying area in a horizontal plane parallel to each other and in the same direction. The conveyor belts are guided on components which extend in conveying direction and have upwardly extending side walls. At the beginning and the end of a conveying distance, the conveyor belts are guided around deflection rollers.

2. Description of the Related Art

Various very different conveyor systems of the above-described type are known in the art. The conveyor system according to the present invention is a conveyor system in which the two endless conveyor belts having a secure cross-section are guided parallel to each other in a plane in a circuit and, thus, form a forward conveying distance and a rearward conveying distance which are both available for conveying material carriers in a circuit. The conveyor belts and material carriers are preferably guided by the oppositely extending side walls, so that the conveyor belts do not leave the conveying path.

SUMMARY OF THE INVENTION

It is the primary object of the present invention to provide a conveyor system of the above-described type in which it is possible to divert the material carriers from the existing conveying path, in order to subject the diverted material carriers to processing and manipulations which are not possible on the existing conveying path. Simultaneously, it should be possible to return the diverted material carriers to the conveying path or to conduct new material carriers onto the conveying path.

In accordance with the present invention, a second conveying path is arranged parallel to and extending along a predetermined portion of the first conveying path, wherein the second conveying path includes two endless conveyor belts which are driven in the same direction independently of the conveyor belts of the first conveying path and extend parallel to each other in a horizontal plane. A switch is provided for transferring the material carriers from one of the conveying paths to the other conveying path.

Accordingly, in accordance with the present invention, a second conveying path is provided which, in the same manner as the first conveying path, is formed by the two parallel conveyor belts. The second conveying path is located next to the first conveying path and extends over a certain portion of the first conveying path. This portion serves to transfer the material carriers from one of the conveying path to the other conveyor path. The transfer is effected by a switch. This makes it possible to transfer selected material carriers from the first conveying path onto the second conveying path. It is also possible to transfer new material carriers from the second conveying path to the first conveying path or to return previously diverted material carriers back to the first conveying path.

In accordance with an advantageous feature of the present invention, the second conveying path includes a bend or deflection of 90° of the conveyor belts.

Each material carrier has a certain coding. Sensors are arranged underneath the conveying path, wherein the sensors can read the coding and control the movement of the switch accordingly.

In a particularly advantageous embodiment, two switches are provided, wherein one switch serves to divert material carriers from the first conveying path and the other switch serves to return the carrier members to the first conveying path.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
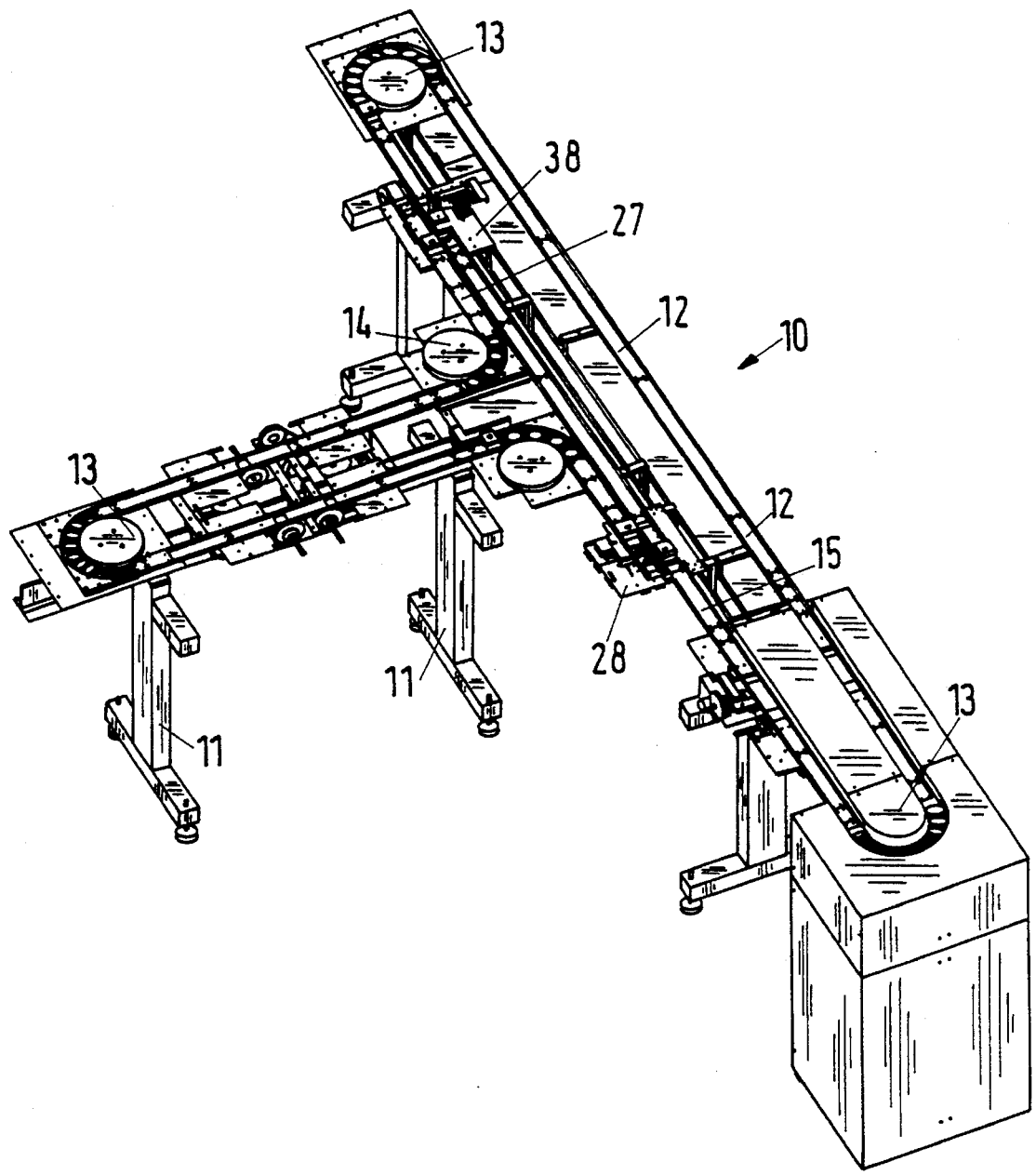
FIG. 1 is a perspective top view of an embodiment of a conveyor system according to the present invention.

FIG. 1 of the drawing shows a conveyor system 10 according to the present invention. The conveyor system 10 rests on a frame or a stand 11 and is composed of individual straight segments 12, 180° turns 13 and 90° bends 14. As a result of this modular construction, the conveyor system 10 can be constructed in almost any desired configuration. The conveyor system 10 is guided in a circuit, so that the objects being conveyed travel through treatment stations and are returned to their initial locations.

Figure 2:
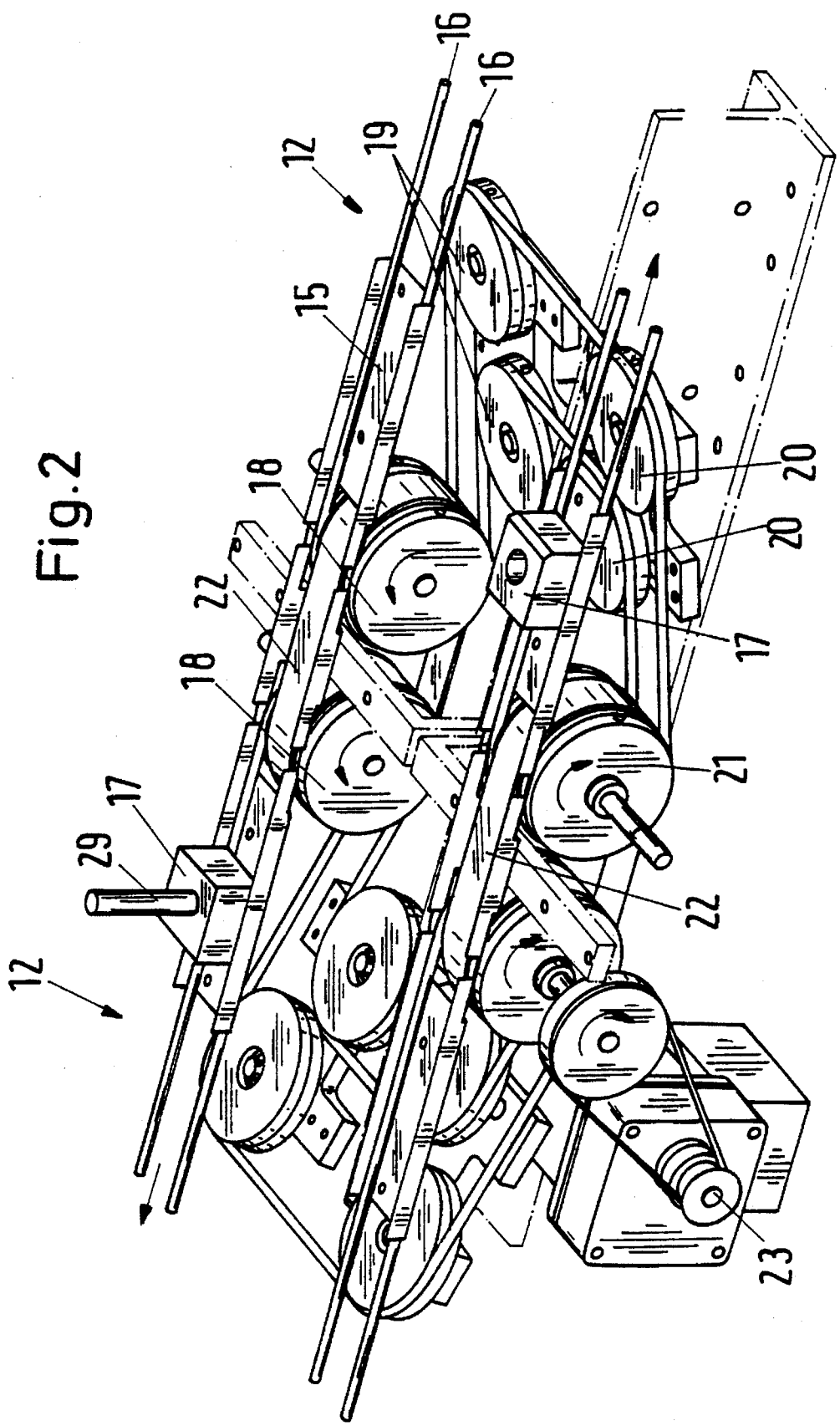
FIG. 2 is a perspective view, on a larger scale, showing a detail of the connection of two conveying segments located one behind the other in longitudinal direction.

The conveyor system shall now be explained in more detail with the aid of FIG. 2 which shows, on a larger scale, a point where two straight segments 12 abut each other. The conveying path 15 is formed by an essentially U-shaped sheet metal, wherein essentially round elastic belts 16 are guided along the lower side edges of the sheet metal. An essentially cubic material carrier 17 is placed on the belt 16 and is conveyed in the conveying direction indicated by an arrow in FIG. 2, wherein the sides of the U-shaped conveying path 15 serves to laterally guide the material carrier.

The belts 16 are preferably composed of a thermoplastic polyurethane. The individual straight segments 12 have an individual belt guidance. The belts 16 are deflected at each end of the segment, wherein the pair of belts 16 traveling towards the end of the segment are deflected vertically downwardly by large deflection rollers 18 and are conducted from there in a horizontal direction underneath the adjacent conveying path 15 by means of inclined large rollers 19. Two pairs of rollers 20 then carry out an analogous deflection in horizontal direction and pairs of large rollers 21 carry out a deflection in vertical direction in order to conduct the pair of belts into the opposite conveying direction. Accordingly, both portions of each conveyor belt 16 are utilized for conveying.

The relatively large rollers have been found particularly advantageous because they minimize the load acting on the belts due to deformations and, thus, minimize the driving force. The arrangement of the horizontally deflecting rollers 19, 20 significantly minimizes the tendency to slippage. The inclined position of the horizontally deflecting rollers 19, 20 reduces the structural size and adapts to a given spacing of a stable carrier system.

The continuous further conveyance of the material carriers 17 between the pairs of belts of individual segments is effected by means of wide toothed belts 22. At desired locations, the toothed belts 22 can be used for transmitting additional drive moments. As a result, it is possible to drive two segments 12 directly with only one drive 23. At transition points where the transmission of torque represents an obstacle, the transition point is uncoupled by a freewheeling mounting of a deflection roller of each wide toothed belt 22.

Figure 3:
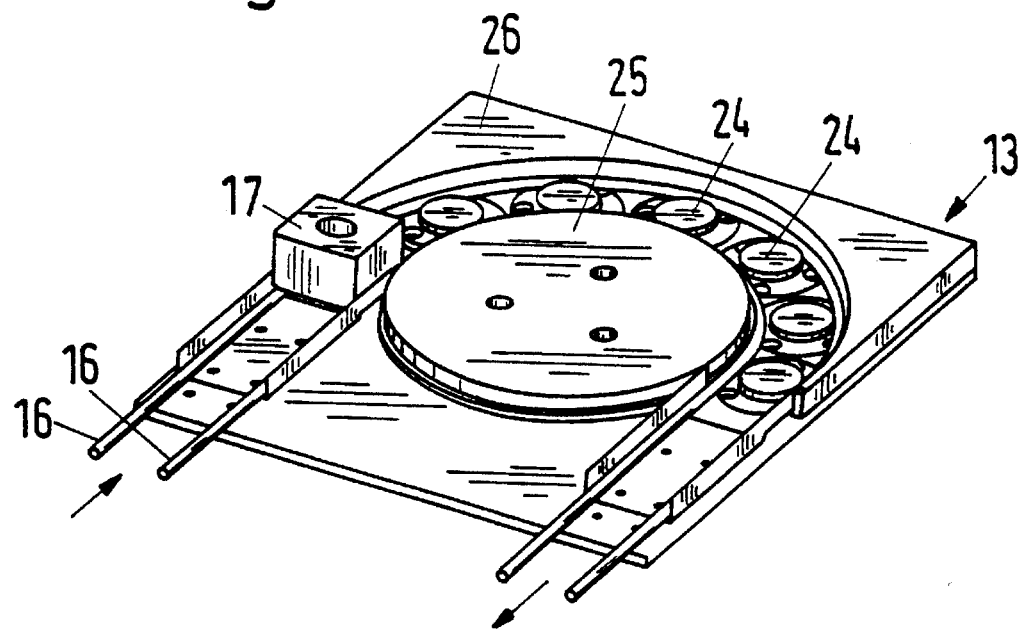
FIG. 3 is a perspective view of a detail showing a deflection by 180°.

A winding conveying path in the horizontal plane is achieved by deflecting the belts 16 at rollers 24, 25. The rollers 24, 25 have a width which does not protrude above the thickness of the belts. FIG. 3 shows a segment 13 in which the conveyor belt pair 16 is deflected by 180°. A large roller 25 serves to deflect the inner belt. The large roller 25 has a circumferential groove for guiding the belt and has an axial extension which is smaller than the diameter of the belt, so that the material carrier rests on the belt also in the curved area. As FIG. 3 also shows, several rollers of smaller diameter are provided for deflecting the outer belt. Structurally, the rollers 24 correspond to the large roller 25. The large roller 25 could also be replaced by a number of several smaller rollers. A shoulder of a curved element 26 adapted to the curvature of the belt serves for the lateral guidance of the material carrier 17.

Figure 4:
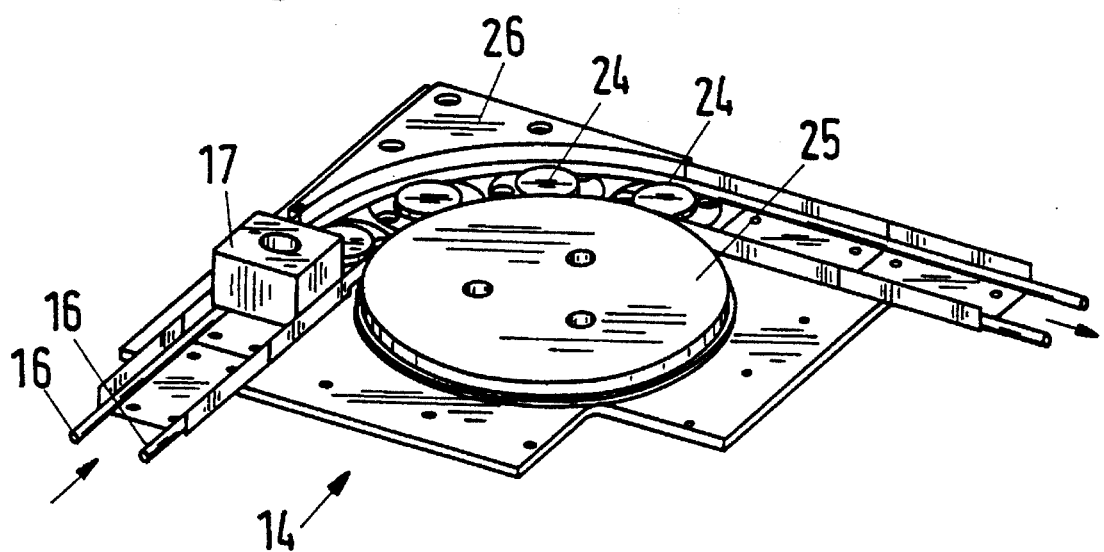
FIG. 4 is a perspective view of a detail showing a deflection by 90°.

An example for the deflection of the pair of belts 16 by 90° is shown in FIG. 4. Also in this case, a large roller 15 serves to deflect the inner belt. Several smaller rollers 24 are provided for the deflection of the outer belt. The construction of the rollers 24 and 25 of the segment 14 corresponds to that of the segment 13. The segment 14 also has a curved element 26 whose shoulder serves to laterally guide the material carrier 17.

FIG. 1 schematically illustrates an additional conveying path 27 which extends parallel along a portion of the conveying path 15. Predetermined material carriers 17 can be pushed from the conveying path 15 onto the conveying path 27 by means of a switch 28. This makes it possible to convey these predetermined material carriers to other or additional locations.

The material carriers 17 are essentially cube-shaped and, in accordance with the illustrated embodiment, have a center opening which serves, for example, for receiving a test tube 29. The material carrier 17 has on its bottom side a coding, wherein, in the area approaching the switch, the identification of the material carrier is carried out by means of initiators or proximity switches arranged transversely of the travel direction. Accordingly, the actuation of the switch is effected in dependence on the respective coding of the material carrier.

Accordingly, in the conveyor system illustrated in FIG. 1, two conveying paths 15 and 27 are provided next to each other, wherein the two conveying paths basically operate and are driven independently of each other. The two conveying paths are constructed in accordance with the same principle in which the round conveyor belts 16 and 36 are conveyed parallel next to each other in the same direction on a conveying path, wherein a forward conveying path and rearward conveying path are available.

Figure 5:
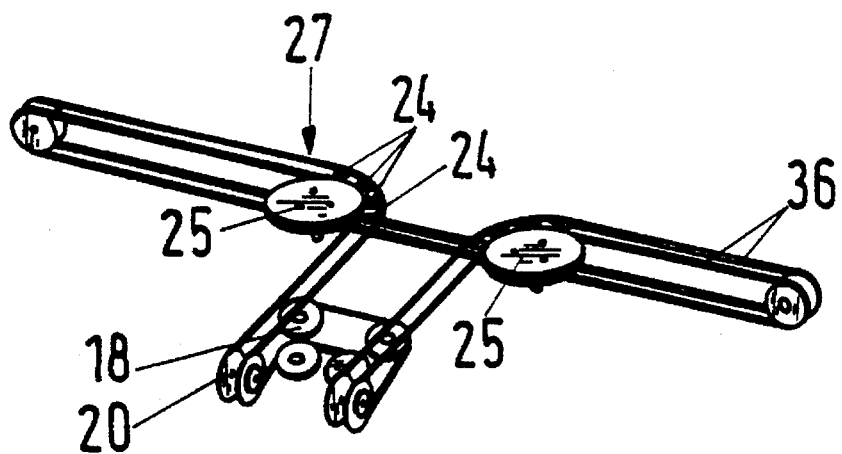
FIG. 5 is a perspective view showing the belt guidance of the second conveying path.

The second conveying path 27 whose belt guidance is once again illustrated in FIG. 5 is located next to the first conveying path 15. The two parallel round conveyor belts 36 travel in the same direction. In the illustrated embodiment, the second conveying path 27 has the shape of a T, wherein the crossbar of the T is located adjacent the first conveying path 15. In this area, the return of the conveyor belt (empty portion) is effected underneath the conveying plane. Accordingly, the returning conveyor belt portion does not carry out a conveying function. The vertical beam of the T is formed by two parallel conveying paths which basically correspond to the conveying path 15. As illustrated in FIG. 1, the two parallel conveying paths can be extended in longitudinal direction, i.e., an additional conveying segment can be added in the manner described above.

FIGS. 6 to 9 show two switches. These switches are also shown in FIG. 1 and are denoted by reference numerals 28 and 38. The switch 38 serves to transfer a material carrier from the first conveying path 15 to the second conveying path 27. The switch 28 serves to return the material carrier 17 or to introduce a new material carrier 17.

Figure 6:
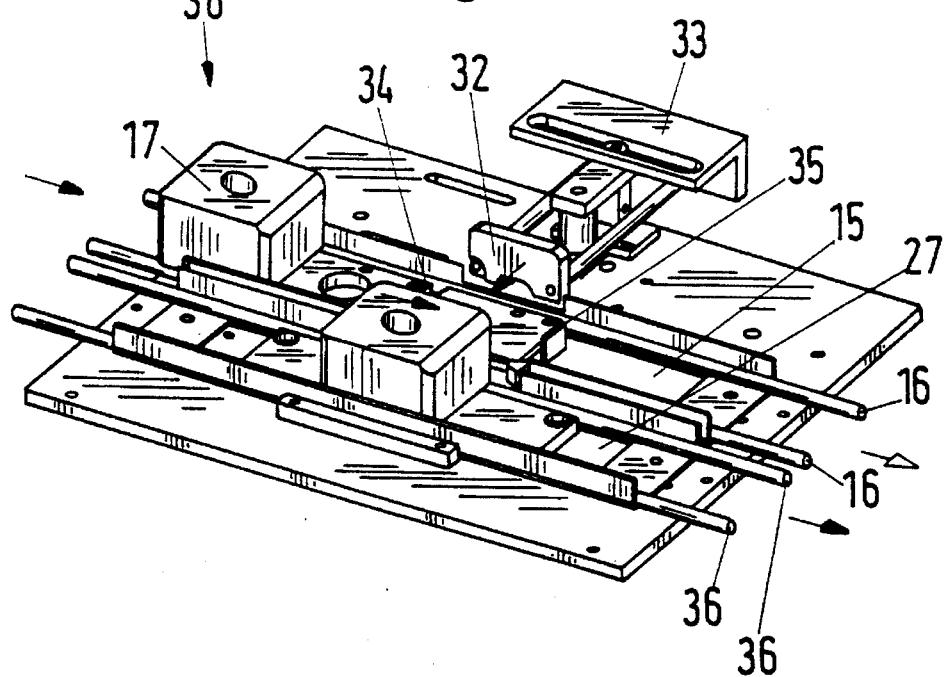
FIG. 6 is a perspective view of a switch for transferring carrier members from the first conveying path to the second conveying path.
Figure 7:
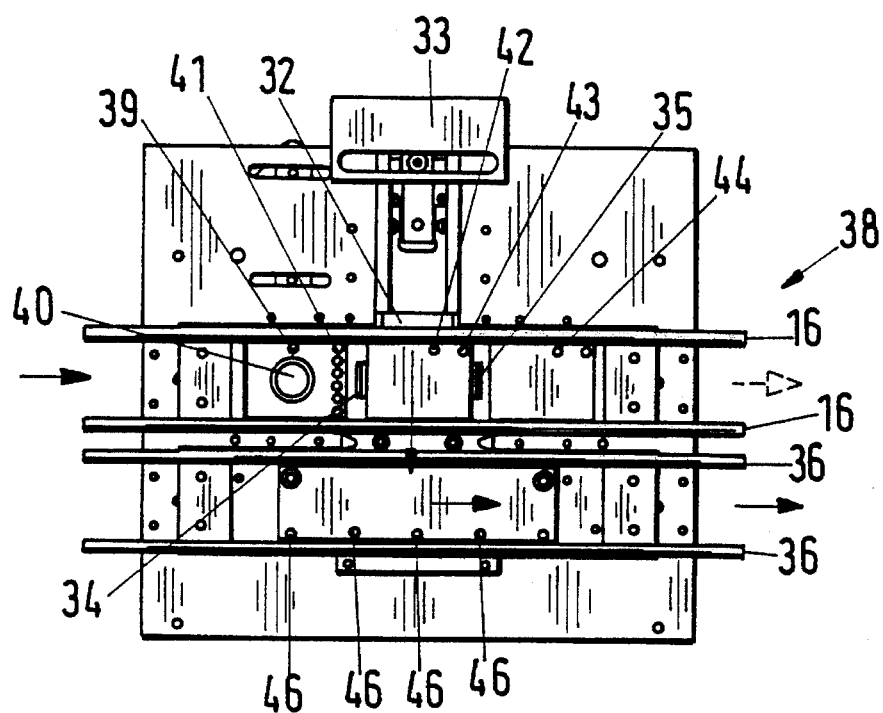
FIG. 7 is a top view of the switch of FIG. 6.
Figure 8:
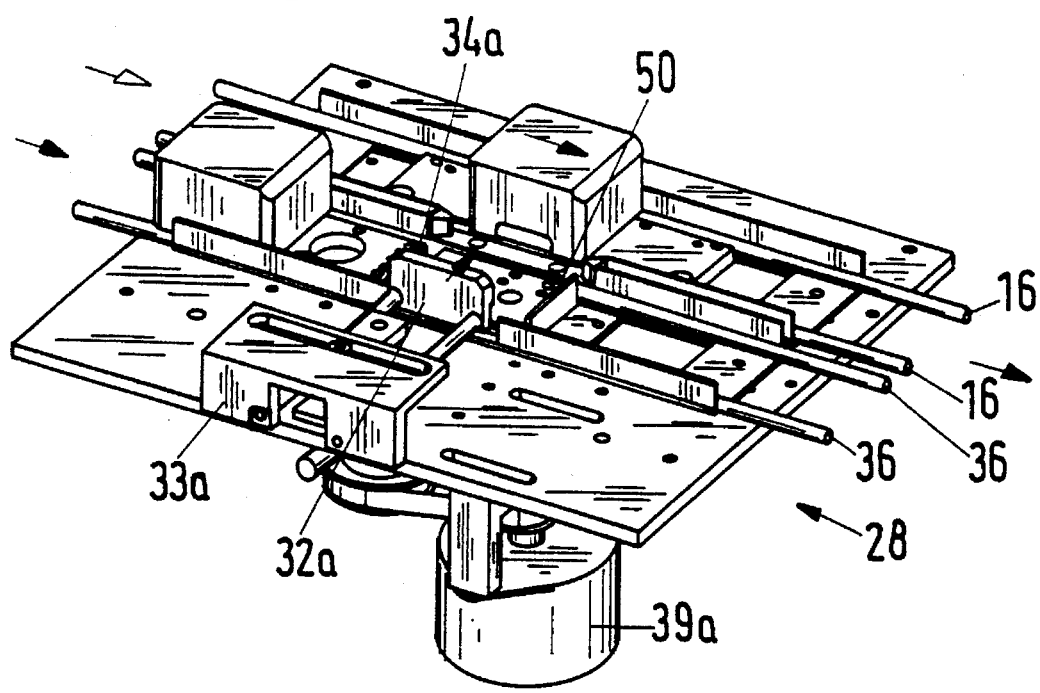
FIG. 8 is a perspective view of the switch for returning material carriers from the second conveying path to the first conveying path.
Figure 9:
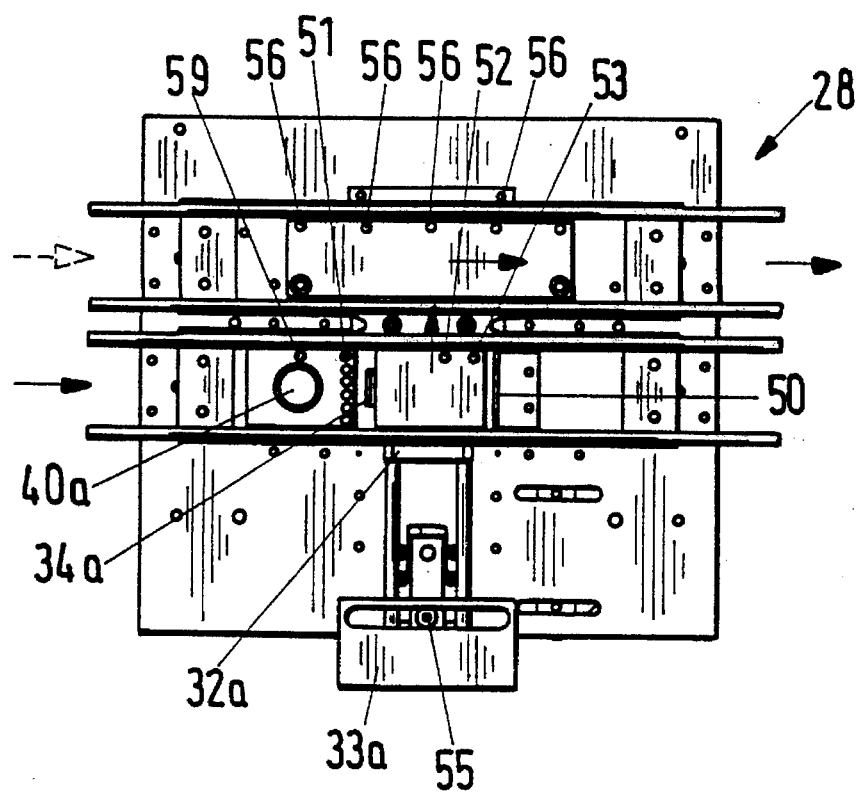
FIG. 9 is a top view of the switch of FIG. 8.

FIGS. 6 and 7 show the switch 38 in detail. The switch 28 shown in FIGS. 8 and 9 is basically of the same construction. The same components are denoted by the same reference numerals.

FIG. 6 shows the two pairs of conveyor belts 16 and 36 which extend parallel to one another and form the two conveying paths 15 and 27. The switch 38 is formed by a transverse slide 32 with an eccentric drive 33. A drive is arranged underneath the conveying paths. The drive is only shown in Fig. 8 and is denoted by reference number 39a. Two stoppers 34 and 35 which can be moved up and down are provided in the area of the conveying path 15. The stoppers 34 and 35 serve to separate the material carriers and, together with the transverse slides 32, carry out a transfer of the material carriers when this is desired.

FIG. 7 shows various initiators or proximity switches 41 to 46 which, as will be described later, control the movements of the transverse slide and of the stoppers.

Figure 10:
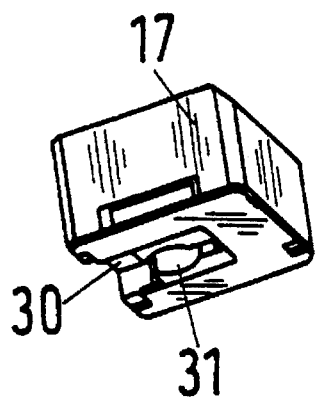
FIG. 10 is a perspective bottom view of a material carrier.

A reading head is denoted by reference numeral 40. The reading head 40 reads the codings 31 on the bottom side of the material carrier, as shown in FIG. 10. FIG. 10 additionally shows a recess 30 of the material carrier 17.

The switch 28 illustrated in FIGS. 8 and 9 is of similar construction, wherein the switch 28 merely serves to return a material carrier 17. The transverse slide is denoted by reference numeral 32a and a stopper is denoted by reference numeral 34a. Since it is necessary to safely prevent a material carrier from unintentionally dropping down at the end of the conveying path 27, a fixed stop 50 is provided at this location instead of the stopper 35 of switch 38.

The proximity switches which control this switch 28 are denoted by reference numerals 51 through 56. The reading head of this switch is denoted by reference numeral 40*a*.

A material carrier 17 as illustrated in FIG. 10 which travels upon the first conveying path 15 enters the area of the switch 38 and makes contact with the stopper 34 in the switch 38. The proximity switch 41 registers the position of this material carrier in front of the stopper and initiates reading of the coding 31 by means of the reading head 14. The coding unequivocally identifies the material carrier. A control unit then decides whether the identified material carrier is to be pushed onto the parallel second conveying path 27. If this is the case, the stopper 34 is lowered and the material carrier travels against the second stopper 34. During this movement of the material carrier, the proximity switch 42 recognizes the position in which the stopper can be moved into the rear recess 30 of the material carrier shown in FIG. 10, in order to stop a material carrier which follows directly subsequently. The final position at the stopper 35 is recognized by the proximity switch 43. The proximity switch 46 recognizes whether the work space of the switch 38 is free and will remain free during the movement of the slide. If this is not the case, the eccentric drive 33 of the switch is started and the material carrier is moved by the transverse slide 32 onto the other conveying path 27.

If the control unit decides that the material carrier is to pass the switch, the two stoppers 34 and 35 are lowered. The material carrier continues to be conveyed by the conveyor belts of the first conveying path 15. As in the case described above, the proximity switches 42 and 44 recognize the positions in which the stopper can be inserted into the recess 30 of the material carrier in order to stop subsequent material carriers.

The switch 28 which serves for the return of material carriers is of similar construction and operates basically in accordance with the same principle as switch 38. A material carrier which is to be transferred from the second conveying path 27 to the first conveying path 15 travels in the switch 28 over the lowered transverse slide 32*a* and makes contact with the fixed stop 50. Any subsequently arriving material carrier is registered by a proximity switch 59. If a material carrier follows immediately, the proximity 52 causes the transverse slide 32*a* to be moved into the recess 30 of the material carrier in order to block the work space of the switch to the subsequent material carrier. The proximity switch 53 registers the fact that a material has made contact with the fixed stop 50. Proximity switches 56 register whether the work space of the switch 28 is free and will remain free during the movement of the slide. If this is the case, the eccentric drive 33*a* is started and the material carrier is pushed onto the conveying path 15*o* The proximity switch 55 registers the end position of the eccentric drive lever and, thus, the end of the operation. The stopper 34*a* releases the switch for the next material carrier.

While specific embodiments of the invention have been shown and described in detail to illustrate the inventive principles, it will be understood that the invention may be embodied otherwise without departing from such principles.

I claim:

1. A conveyor system particularly for material carriers for use in medical laboratories, the conveyor system comprising a first conveying path comprising components having upwardly extending side walls, the conveying path having a beginning and an end, two endless conveyor belts guided parallel to each other in a horizontal plane and driven by a motor in the same direction on the components, the conveyor belts being guided around deflection rollers at the beginning and the end of the conveying path, further comprising a second conveying path extending in the horizontal plane parallel next to a portion of the first conveying path, the second conveying path comprising second components having upwardly extending side walls, the second conveying path having a beginning and as end, two endless conveying belts guided parallel to each other in a horizontal plane and driven by another motor in the same direction on the second components, the conveyor belts of the second conveying path being guided around deflection rollers at the beginning and the end of the second conveying path, further comprising at least one switch for transferring the material carriers between the first conveying path and the second conveying path, wherein the second conveying path has a T-shaped configuration including a cross-member and a beam member, the cross-member extending parallel to the first conveying path and the beam member extending perpendicularly to the first conveying path, so that the second conveying path comprises a 90° bend, wherein, in the cross-member of the second conveying path, the conveyor belts include a return portion extending underneath the second conveying path.

2. The conveyor system according to claim 1, wherein the material carriers have a bottom side provided with a coding, further comprising proximity switches for identifying the codings of the material carriers and for controlling the switch.

3. The conveyor system according to claim 2, wherein the proximity switches and a reading head are mounted under each conveying path in an intermediate space between spaced-apart conveyor belts.

4. The conveyor system according to claim 3, comprising a first switch for transferring the material carriers from the first conveying path to the second conveying path, and a second switch for transferring the material carriers from the second conveying path to the first conveying path.

5. The conveyor system according to claim 4, comprising proximity switches and a reading head for the second switch for registering a position of a material carrier.

6. The conveyor system according to claim 4, wherein each switch comprises a transverse slide for moving a material carrier between the first and second conveying paths, and a least one stopper for stopping a material carrier traveling on one of the conveying paths and to be transferred to another of the conveying paths.

7. The conveyor system according to claim 6, wherein the first switch for transferring the material carriers from the first conveying path to the second conveying path comprises two stoppers and the second switch for transferring the material carriers from the second conveying path to the first conveying path comprises a stopper and a fixed stop.

8. The conveyor system according to claim 1, wherein the conveyor belts have a round cross-section.

* * * * *